United States Patent [19]
Crossan

[11] 3,932,047
[45] Jan. 13, 1976

[54] CONNECTING SYSTEMS

[76] Inventor: James Crossan, 512 Indian Road, Burlington, Ontario, Canada

[22] Filed: Mar. 3, 1975

[21] Appl. No.: 554,799

[52] U.S. Cl. .............. 403/186; 403/241; 403/387; 108/156
[51] Int. Cl.² ........................................ F16B 9/02
[58] Field of Search ........... 403/241, 263, 387, 384, 403/186; 248/188, 188.1, 151; 211/148; 108/156, 110, 151

[56] References Cited
UNITED STATES PATENTS

| | | | |
|---|---|---|---|
| 1,551,625 | 9/1925 | Schwartz | 403/241 |
| 1,681,218 | 8/1928 | Carlson | 108/110 |

*Primary Examiner*—Andrew V. Kundrat
*Attorney, Agent, or Firm*—Hirons & Rogers

[57] ABSTRACT

In a connecting system for connecting a first hollow tubular member to a second member the first member is provided with a circumferentially-extending slot of a longitudinal extent sufficient to receive the second member therein, and the second member is provided with an arcuate slot of a width to receive the sidewall of the first member, the first member sidewall being engaged in the second member arcuate slot by rotation of the former about its longitudinal axis.

16 Claims, 10 Drawing Figures

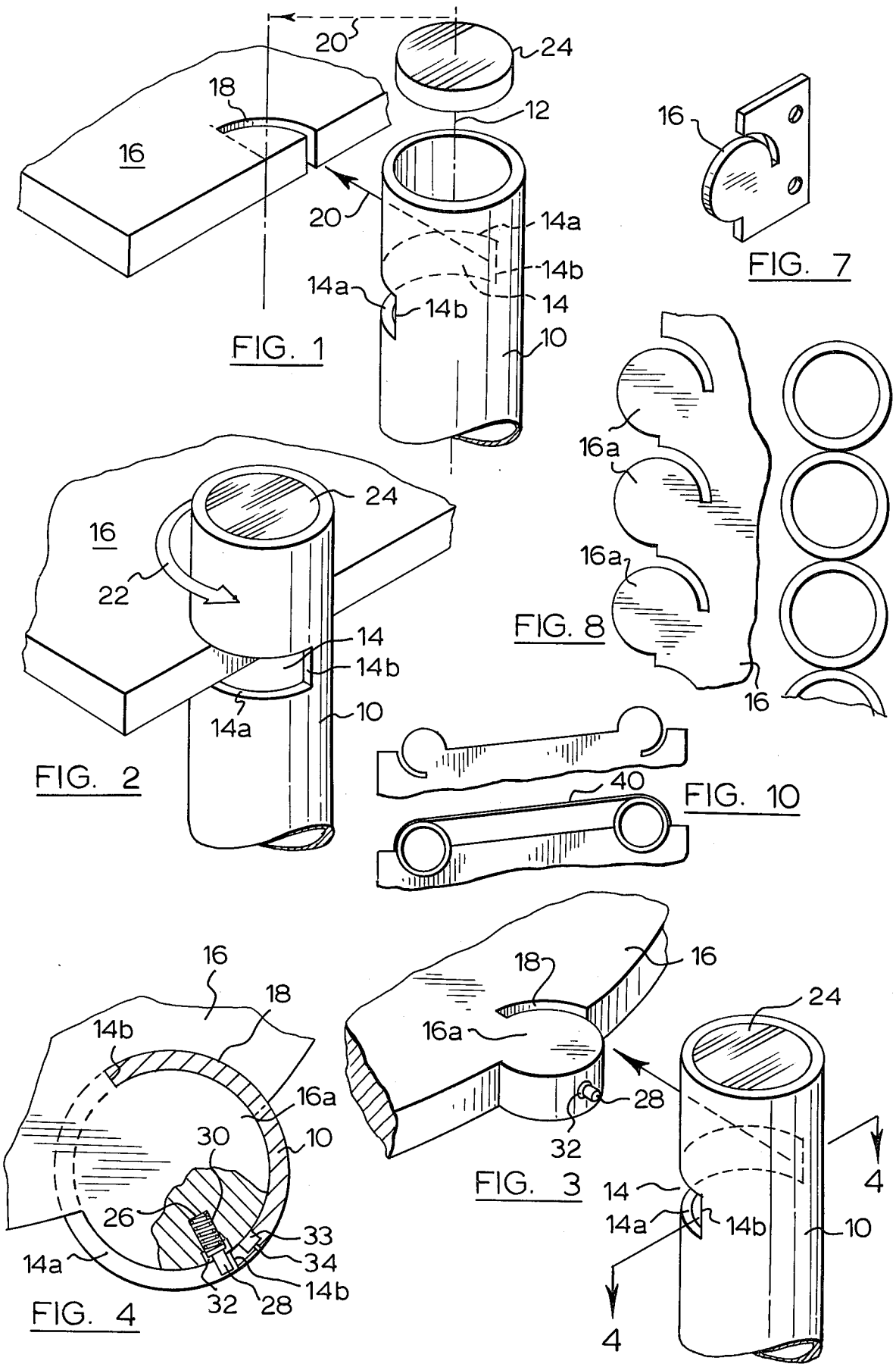

CONNECTING SYSTEMS

FIELD OF THE INVENTION

The present invention is concerned with improvements in or relating to connecting systems, and especially to such systems for connecting a hollow tube member to another member.

REVIEW OF THE PRIOR ART

The field of connectors for joining together two members to form an assembly is extensive, and numerous attempts have been made to provide systems that are simple and relatively inexpensive to manufacture, while providing a strong and effective joint between the two connected members. In many applications also it is desired to provide a system whereby the resultant joint is inherently relatively concealed or unobvious, so as to enhance the overall appearance of the resultant structure. It is further a desirable attribute of the system that the joints shall be capable of assembly and disassembly without the use of special tools, and ideally without the use of tools at all.

DEFINITION OF THE INVENTION

It is an object of the invention to provide a new connecting system for connecting together a hollow tube member and another member.

In accordance with the invention there is provided a connecting system for connecting together a first hollow tubular member having a longitudinal axis to a second member, wherein the first member has in the circumferential wall thereof a circumferentially-extending slot of a longitudinal extent to receive the second member therein, and the second member has therein an arcuate slot of a width to receive the first member side wall therein upon reception of the second member in the first member slot, the first member side wall being engagable in the second member arcuate slot by rotation of the first member about the said longitudinal axis.

DESCRIPTION OF THE DRAWINGS

Particular preferred embodiments of the invention will now be described, by way of example, with reference to the accompanying diagrammatic drawings wherein:

FIG. 1 is a perspective view of a first embodiment of the system as applied to a hollow cylindrical first member and a single flat planar second member, such as a shelf, the two members being shown in position for assembly, FIG. 2 is a similar view to FIG. 1 showing an intermediate state of assembly, FIG. 3 is a similar view of a second embodiment, FIG. 4 is a section taken on the line 4—4 of FIG. 3, FIG. 7 illustrates an embodiment wherein the second member is in the form of a bracket for attachment to a further member, FIG. 8 shows an embodiment employing multiple closely-spaced first members, FIG. 10 shows a further embodiment.

DESCRIPTION OF THE PREFERRED EMBODIMENT

Figure 5:
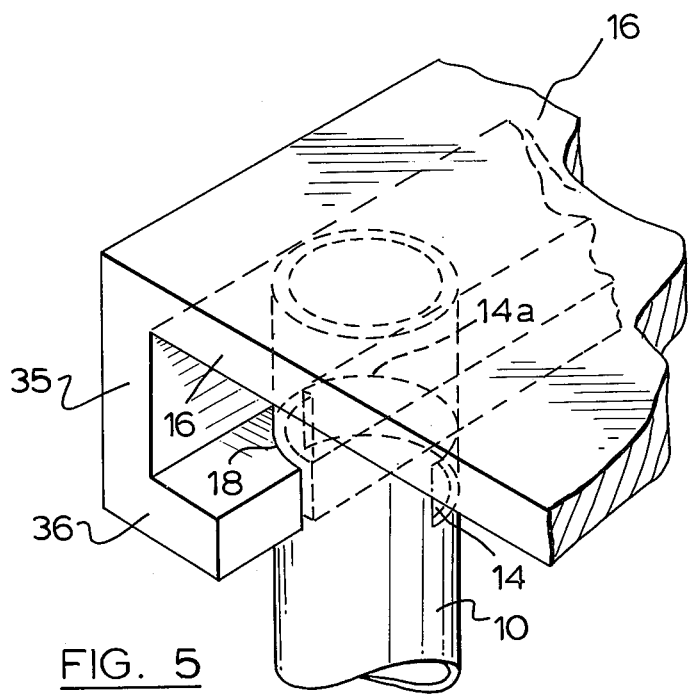
FIG. 5 is a perspective view of a further embodiment as applied to a table construction.

Referring now to FIGS. 1 and 2, the first hollow tubular member of the first embodiment comprises a uniform-diameter cylindrical tube 10 having a longitudinal axis 12, the side wall being provided with a circumferentially extending slot 14 that in this embodiment is approximately semi-circular (180°) in extent. The first member is intended to be connected to a flat planar straight-sided second member 16, such as a shelf, which is provided with an arcuate slot 18 of 90° extent struck about the same radii as the walls of the first member and with the axis of its radii lying in the plane of the wall to which the slot 18 opens. In this embodiment the slot 14 is necessarily of 180° extent but in other embodiments it may be more or less than this amount. Similarly, in this embodiment the slot 18 is of 90° extent but in other embodiments it may be more or less than this.

The longitudinal extent of the circumferential slot 14 between its edges 14a is just sufficiently larger than the thickness of member 16 for the latter to be freely received in the slot without sustantial play, when assembled as shown in FIG. 2. The width of the arcuate slot 18 is just sufficiently larger than the radial thickness of the wall of the member 10 for the said wall to be freely received therein without substantial play, when the edge 14b is engaged in the slot, as indicated by the arrows 20 in FIG. 1. The two members are therefore readily, firmly and securely connected together by such engagement and subsequent rotation of the member 10 about its longitudinal axis 12, as indicated by the arrow 22 in FIG. 2, through an angular extent of about 90°.

The two members are firmly held against movement relative to one another, except for the reverse of the rotation employed for assembly, by close engagement of the slot walls and edges against adjacent surfaces of the other member. The said reverse rotation is sufficiently unusual that it is unlikely to occur spontaneously, but only by a definite motion of someone wishing to disconnect the members, especially if the members are made to fit very closely together with considerable friction between them opposing such rotation. The open end or ends of the first member may be closed by a closure, such as the disc-like member 24 that is a press fit therein.

In the embodiment illustrated by FIGS. 3 and 4 the second member 16 is planar but is not straight-sided, but may instead be a top for a three- or four-legged table or the like. The part 16a of the second member that is inserted in the slot 14 is of shape corresponding to the internal cross-section of the first member, so that it closes the passage therein and will assist in maintaining the cross-section thereof. As illustrated the part 16a is provided at the continuous curved edge of a round top, but it can also be provided at corners of an appropriately shaped top.

In this embodiment also a radially-extending hole 26 in the part 16a contains a pin 28 that is urged radially outwards by a spring 30 and is retained therein by a ring 32. Upon rotation of the first member to the maximum extent permitted by the slot 18 the pin snaps into the slot 14 and engages the immediately adjacent wall 14b to prevent reverse rotation; the joint is thereby positively locked and can only be disassembled following deliberate retraction of the pin 28.

In a modification of this arrangement the pin is engaged in a blind hole 33 formed in the inside wall of the member 10 just beyond the edge 14b, so that the fastening is virtually completely concealed to provide a decorative appearance. A small counterbore 34 permits the insertion of a fine pin to retract the pin 28 when disengagement is required.

In the embodiment illustrated by FIG. 5 the second member has an edge 35 extending from the planar part 16 and a returned flange 36 extending from the edge 30 parallel to the part 16, the slot 18 being provided in the flange 36. The distance between the facing surfaces of the flange 36 and part 16 is equal to that between the top end of the tube 10 and the upper edge 14a of slot 14, so that the part 16 rests on the top of the tube. The connection can thereby be relieved of the weight of the part 16 and anything supported thereby and, in addition, the connection is substantially completely concealed from direct view.

Figure 6:
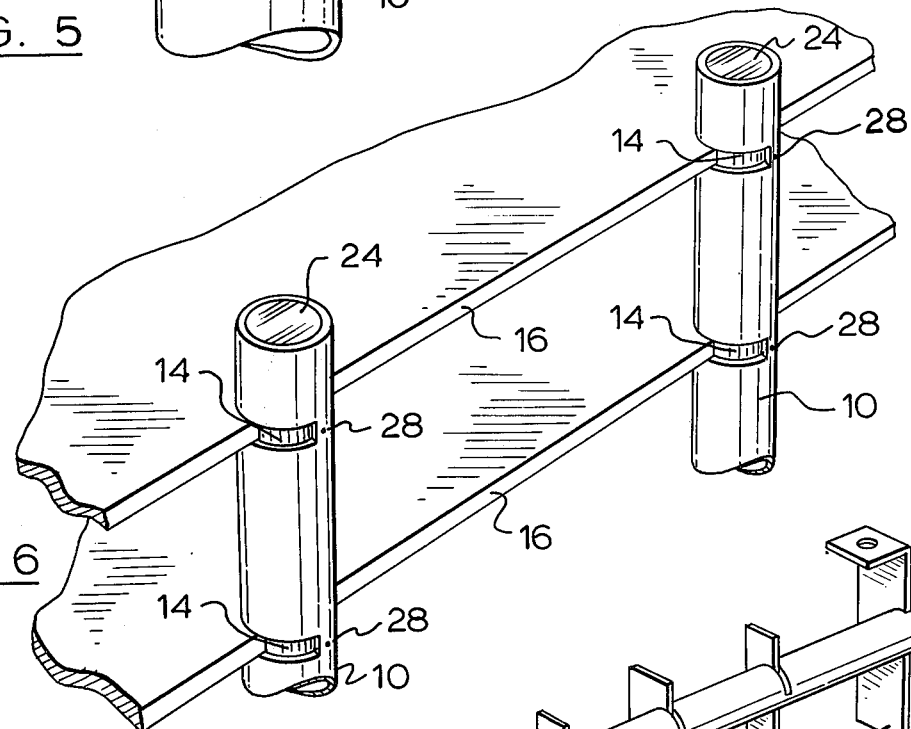
FIG. 6 is a similar view of a further embodiment as applied to a double shelf construction.

FIG. 6 illustrates the manner in which the invention is applied to a structure comprising two spaced first members 10 and/or spaced second members 16.

Also in this embodiment the pin 28 is a simple straight member that is inserted into the corresponding holes in the members 10 and 16 when these holes have been brought into register by rotation of the member 10.

FIG. 7 shows the application of the invention to an assembly in which the member 16 comprises a preformed bracket, formed for example of wood, metal or plastic, that is in turn adapted for fastening, as by screws of vanes, to another member, such as a shelf, tabel top, chair member, etc.

The member 16 illustrated by FIG. 8 is adapted for use with a plurality of cylindrical members 10, the spacing of the slots 18 being such that the members 10 will be so closely spaced as to touch one another, providing a corresponding decorative appearance.

Figure 9:
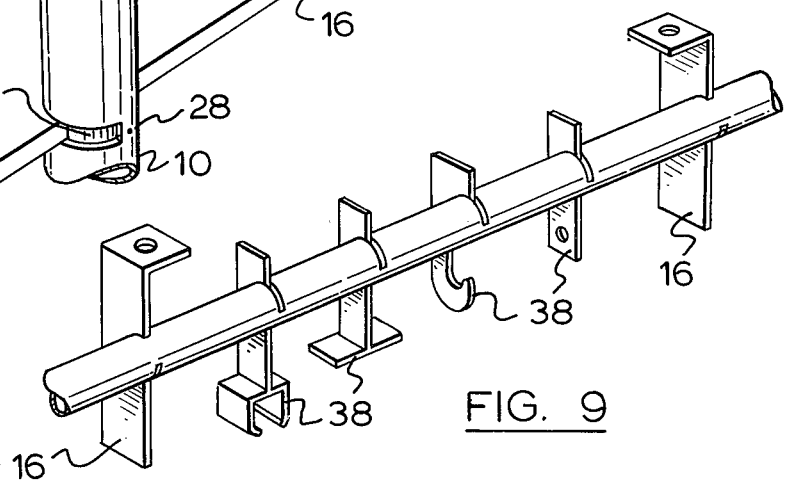
FIG. 9 shows the application of the invention to a suspension structure.

FIG. 9 shows the application of the invention to a suspension system wherein the cylindrical member 10 is a horizontal suspension tube that is mounted, for example, to a wall or ceiling by means of two space brackets 16 of the type illustrated by FIG. 7. Other members 38 are attached to the tube 10 by use of the invention and constitute suspension members of any required kind.

FIG. 10 illustrates an embodiment in which the two slots 18 are of opposite "hand", so that the respective members 10 must be rotated in opposite directions to be mounted therein. This does provide the opportunity of using the invention to mount a flexible member under tension. Thus, the flexible member 40, such as a piece of canvas, has two members 10 attached at opposite parallel-edges and is of such length that it is under the desired tension when the members have been rotated into the fully assembled position. Such an embodiment is particularly suited for use with a chair seat or wall decoration.

It will be understood that in some embodiments it may be necessary for the rotation of the first member about its longitudinal axis to effect the simultaneous connection to more than one second member. It will also be apparent that the tubular member need not be of uniform diameter along its length, but can be tapered, or even stepped, provided that corresponding changes are made in the shape and configuration of the slot or slots 18.

Another application of the invention is, for example, to a staircase in which the individual treads are mounted between two vertical post members. A spiral staircase may be constructed using a single central post member 10, while the individual stairs constitute separate member 16; additional post members spaced from the central member can of course be provided for the treads if the single central post is insufficient. The invention is also applicable to a child's construction set using combinations of different members 10 and 16.

The illustrated and described embodiments show only a few of the different possibilities of application of the system of the invention and other applications and structures within the scope of the appended claims will be apparent to those skilled in the art.

I claim:

1. A connecting system for connecting together a first hollow tubular member having a longitudinal axis and a second member, wherein the first member has in the circumferential wall thereof a circumferentially-extending slot of a longitudinal extent to receive the second member therein, and the second member has therein an arcuate slot of a width to receive the first member side wall therein upon reception of the second member in the first member slot, the first member side wall being engagable in the second member arcuate slot by rotation of the first member about the said longitudinal axis.

2. A system as claimed in claim 1, wherein the said first member is a cylinder of uniform diameter along its length.

3. A system as claimed in claim 1, wherein the said second member is a flat planar member.

4. A system as claimed in claim 1, wherein the said circumferential slot extends over 180° of arc.

5. A system as claimed in claim 1, wherein the said arcuate slot extends over 90° of arc.

6. A system as claimed in claim 1, and including means for closing the open end or ends of the tubular member.

7. A system as claimed in claim 1, wherein the part of the second member that is received in the said circumferential slot is of a shape to fill the entire internal cross-section of the first member at that location.

8. A system as claimed in claim 1, wherein the second member is provided with a spring-loaded retaining member engaging a longitudinal edge of the circumferential slot upon connection of the two members to prevent disconnection of the members without manual disengagement of the member from the edge.

9. A system as claimed in claim 7, wherein the part of the second member that is received in the circumferential slot is provided with a spring-loaded retaining member engaging a longitudinal edge of the circumferential slot upon connection of the two members to prevent disconnection of the members without manual disengagement of the member from the edge.

10. A system as claimed in claim 1, wherein the said second member comprises a planar top part and a flange part spaced from and parallel to the said top part, and the said arcuate slot is provided in the flange part.

11. A system as claimed in claim 1, wherein the said second member comprises a planar top part and a flange part spaced from and parallel to the said top part, the said arcuate slot is provided in the flange part, and the length of the part of the first member between the flange part and the top part is such that the corresponding end of the first member is engaged with the top part.

12. A system as claimed in claim 1, and comprising two first members each connected with a common second member.

13. A system as claimed in claim 1, and comprising a single common first member connected to two second members.

14. A system as claimed in claim 1, and comprising two first members each connected with two second members.

15. A system as claimed in claim 1, and comprising two first members, wherein rotations in opposite directions are required for engagement of the first member in their respective second members.

16. A system as claimed in claim 1, and comprising two first members, having a flexible member connected there-between, wherein rotations in opposite directions are required for engagement of the first members in their respective second members.

* * * * *